United States Patent Office 3,517,581
Patented June 30, 1970

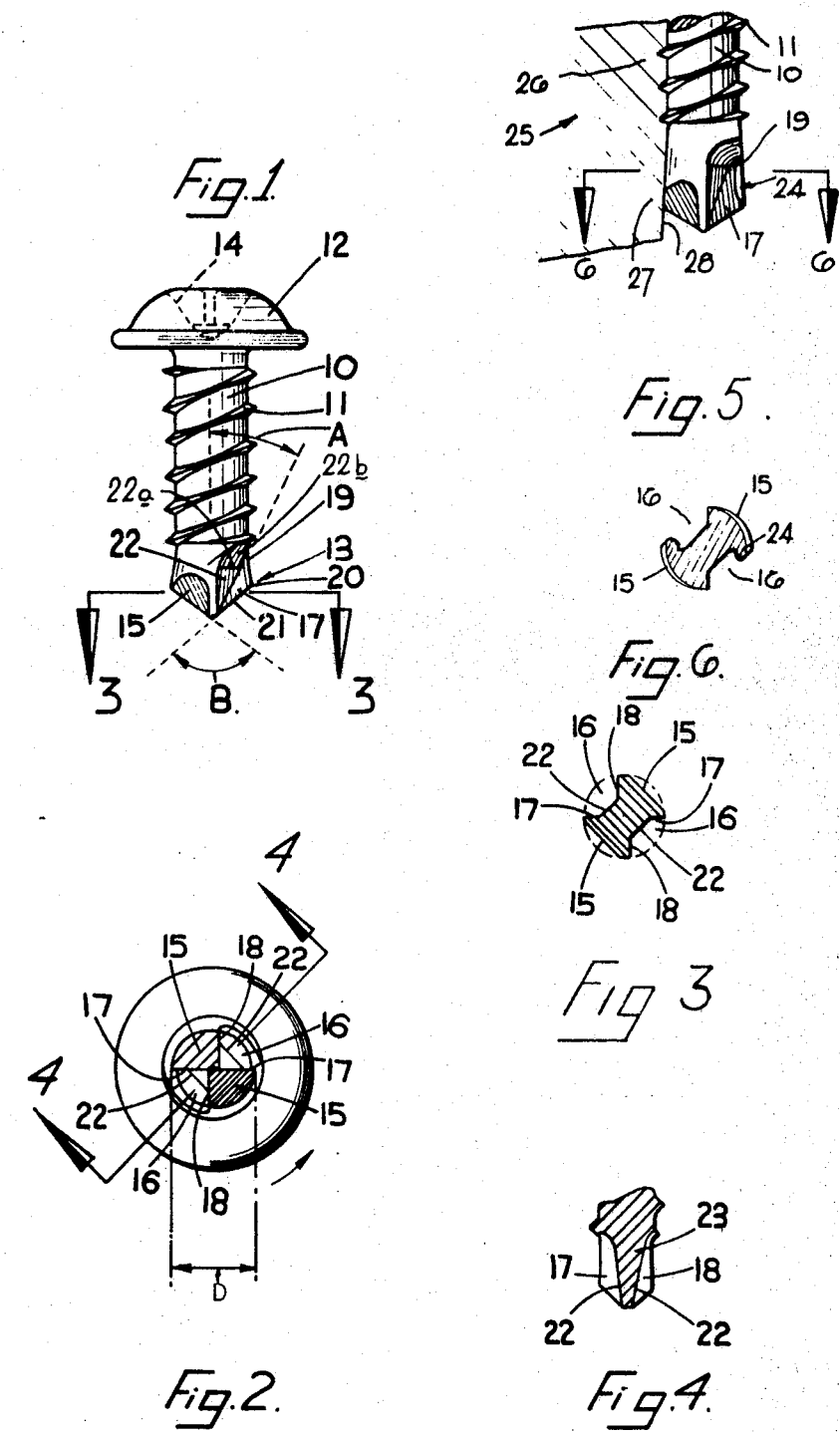

3,517,581
SELF-TAPPING SCREW
Kenneth John Stokes, Kidderminster, and John Hilton Turnbull, Stourport, England, assignors to G.K.N. Screws & Fasteners Limited, Worley, England, a British company
Filed Dec. 27, 1968, Ser. No. 787,339
Claims priority, application Great Britain, Jan. 9, 1968, 1,346/68
Int. Cl. F16b 25/00
U.S. Cl. 85—47            5 Claims

ABSTRACT OF THE DISCLOSURE

A self-tapping screw designed to pierce its own pilot hole in a metal sheet, when used with a driving tool which applies simultaneously vibratory impacts and rotary torque to the screw, the screw having a point formation which comprises two planar piercing faces and two drill flutes, the edge which is formed between each piercing face and the leading face of its adjacent drill flute being a shearing and piercing edge in use.

---

This application is a continuation-in-part of our prior application Ser. No. 711,696, filed Mar. 8, 1968, now abandoned.

Background of the invention

This invention relates to an improved self-tapping screw for use with a screw-driving tool which delivers impacts to the screw along the direction of its axis, causing the point of the screw to penetrate a metal workpiece, and which tool also applies, simultaneously with the impacts, rotary torque to the screw at the speed of rotation necessary for tapping into the pilot hole formed by the point of the screw.

Description of the prior art

In order to avoid the hitherto general practice of providing pre-formed pilot holes in a metal workpiece with which self-tapping screws are to be used, there have been proposed several types of self-tapping screw provided with a drill formation point such that the screw, when rotated, is adapted to drill its own pilot hole in a workpiece followed by the tapping of the screw into the workpiece. Such self-drilling, self-tapping screws are not entirely satisfactory due to the presence of swarf produced by the drilling action and also due to the fact that the speed of rotation of the screw required to provide the drilling action is much higher than the speed of rotation required for the tapping operation, with the result that such high speed rotation can result in stripping of the thread in the workpiece, particularly in thin sheet metal.

The object of this invention is to provide an improved self-tapping screw having a point adapted to form its own pilot hole in a workpiece when the screw is subjected simultaneously to axially directed impact and rotary torque at the speed of rotation necessary for tapping into the workpiece, and a further object is to provide a screw which will eliminate, or substantially reduce, the disadvantage of swarf above referred to.

Summary of the invention

According to the invention, we provide a self-tapping screw having a head at one end of a threaded shank and a point formation at the other end wherein the point formation comprises a number of planar piercing faces which are equi-angularly spaced apart about the axis of the screw and a corresponding number of drill flutes each disposed, and extending between, adjacent piercing faces, each piercing face extending from the extremity of the point formation in a direction radially outwardly and towards the head and each drill flute having a leading side wall in a radial plane, or parallel to a radial plane, in relation to the screw axis, the outer edge of said leading side wall being contiguous with the edge of the immediately adjacent piercing face whereby such outer edge constitutes a shearing and piercing edge when the screw is subject to impact in the direction of its axis and subject to rotary torque about its axis.

The expression "leading side wall" used herein will be understood as referring to that wall of the drill flute which is facing in the direction of rotation when the screw is being rotated about its axis in the normal way for tapping.

In a preferred version, the screw according to the invention has two piercing faces and two drill flutes and the thread on the shank is of two-start form.

In such preferred version, each drill flute has a planar base extending between its side walls, which base extends from the point extremity radially outwardly and in a direction towards the head of the screw.

Also, the leading side walls of the two drill flutes may be in a common plane which is diametrical, with the trailing side walls lying in spaced parallel planes which are equi-angularly spaced from the screw axis on opposite sides thereof.

Brief description of the drawings

FIG. 1 is a side view of a self-tapping screw according to the invention on a considerably enlarged scale,
FIG. 2 is an underneath plane view on FIG. 1,
FIG. 3 is a section on the line 3—3 of FIG. 1, and,
FIG. 4 is a section on the line 4—4 of FIG. 2, and,
FIG. 5 is a fragmentary view showing a modification and illustrating diagrammatically a step in the method of production, and,
FIG. 6 is a section on line 6—6 of FIG. 5.

Description of the preferred embodiment

Referring to FIG. 1, the screw shown comprises generally a shank 10 having thereon, a hardened thread 11 of two-start form with a head 12 at the one end of the shank and a point formation generally indicated at 13 at the other end. As shown, the head 12 is provided with a generally known form of cruciform type of recess 14 for driving purposes although any other form of recess, slot or the like for driving purposes may be provided on the head 12 or such head may be of hexagonal or other non-circular for driving by a suitable socket tool.

Referring now also to FIGS. 2, 3 and 4, the point formation 13 has two planar piercing faces 15 and two drill flutes 16. Each piercing face 15 is contiguous, at its edges, with two side faces which lie in planes which extend in the axial direction of the screw and these two side faces are defined, one by the leading side wall 17 of the one adjacent flute, and the other by the trailing side wall 18 of the other adjacent flute.

It will be observed from FIG. 1 that each leading side wall 17 of each drill flute has an edge 19 which extends from the shank 10 in the direction radially outwardly and downwardly towards the point extremity to an intermediate point 20 and a further edge 21 which extends from the intermediate point 20 radially inwardly and downwardly to the point extremity. As will be observed from FIG. 1, the intermediate point 20 forming the joint or apex between the edges 19 and 21 is at a radial distance from the central axis of the screw which is greater than the radius of the core of the shank 10.

Also each drill flute 16 has a planar base 22 extending between its side walls 17 and 18 and also extending in the direction upwardly and radially outwardly from the point extremity. The angle A as indicated in FIG. 1 between the plane of the base 22 of the drill flute and the axis of the screw is preferably of the order of 20° so that the complete angle subtended at the point extremity by the two planar bases 22 of the drill flutes, is preferably of the order of 40°.

Between the edge 22a of each base 22 and the end of the shank 10 where the screw thread starts, there is a planar wall portion 22b which is inclined radially outwardly and in the direction towards the head 12, the angle of inclination of such wall portion 22b in relation to the screw axis being greater than the angle A, as can be seen from FIG. 1.

Also, as will be observed, the side walls 17 defining one side of each of the piercing faces 15 are coincident and lie on a diameter in relation to the axis of the screw whereas the side walls 18 defining the other sides of the piercing faces 15 lie on lines which are parallel to one another and in parallel spaced planes disposed on opposite sides of the central axis of the screw by an equal amount.

The result of this configuration as is seen in FIG. 4, is that there is provided a relatively thick web 23 across the central axis of the point between the two drill flutes which assists materially in maintaining the strength of the point despite the removal of metal necessary to provide the two drill flutes.

When such a screw is used in a tool which applies simultaneously vibratory axially directed impact and rotary torque to the screw, the edges 21 of the leading side walls of the drill flutes act as shearing and piercing edges to produce in the metal sheet a pilot hole which has a diameter of the size indicated by the dimension D in FIG. 4, being the distance between the points 20 as measured directly across a diameter of the screw axis.

Preferably the angle subtended by the edges 21 as indicated at B in FIG. 1, lies between the values of 90° and 140°.

When such a screw is used under the effect of combined vibratory impact and rotary torque, a pilot hole is produced with little or no production of swarf and it appears that there is produced a combined piercing and swaging action by virtue of the combined vibratory impact and rotary torque with the edges 21 of the drill flutes providing superimposed shearing and piercing effects.

Because the screw has a combined piercing and drilling action, less swarf is produced than with the prior type of self-drilling point screw and also the vibratory piercing action crushes and releases any small amount of swarf that is produced.

In the manufacture of the screw shown in FIG. 1, there is first provided a blank of plain cylindrical form and then in generally known manner the head 12 is formed at one end of such blank and the other end portion which is to constitute the point formation is reduced in diameter by a known extruding operation. The point formation is then provided on this reduced diameter end portion using dies of the appropriate form in a pinch pointing operation and the displacement of metal in the radially outwards direction produced by such pinch pointing operation results in the production of the point form with the outwardly inclined edges as hereinbefore described. The thread is then rolled on the plain portion of the shank 10.

Referring now to FIGS. 5 and 6 there is shown a screw according to the invention having a slightly modified form of point which is produced by a method somewhat different from the above described method for the production of the screw as shown in FIG. 1.

The point formation of the screw shown in FIGS. 5 and 6 is very similar to that of FIG. 1 and like reference numerals used in FIGS. 5 and 6 to refer to the parts of the point which correspond with parts shown in FIG. 1.

The difference between the point of FIG. 5 and that of FIG. 1 occurs on the edge 19 of the leading face 17 of each of the drill flutes and arises out of the slight difference in method of manufacture between the point of FIG. 5 and that of FIG. 1.

In forming the screw according to FIG. 5 a cylindrical blank is provided with a head but, as distinct from the production of the screw according to FIG. 1 the other end portion of the blank is not reduced and this end is then pinch pointed in the same manner as with FIG. 1 to produce the particular point formation. This pinch pointing operation results in metal being displaced radially outwardly at the point but because the pinch pointing operation is performed on the end portion of the blank which is not of reduced diameter then the metal is displaced radially outwardly to a greater extent than is the case with the point of FIG. 1 and to such an extent that the maximum transverse dimension of the point would be unacceptable as it would result in the production of an oversize pilot hole.

Thus, when the blank so produced is acted upon to produce the thread 11 there is used a die which is indicated diagrammatically at 25 in FIG. 5 and this die, in addition to the portion 26 for producing the normal thread form has a further plain portion 27 which acts upon the end of the blank which has been pinch pointed to form the point.

The plain face 28 of the portion 27 of the die is in a plane which is not exactly parallel to the axis of the shank of the screw but which is inclined at a small angle thereto or, in other words, this part of the face of the die has a slight relief which can be seen in FIG. 5, although it will be appreciated that on this enlarged scale the angle of relief of the face 28 is somewhat exaggerated. The effect of rolling the point formation between flat dies of the form shown at 25 is to reduce the radially extending part formed by the pinch pointing operation and in so doing the metal along the edges 19 is displaced in the circumferential direction to form a thickened or bulged part 24 on each leading face 17 of each drill flute such portion 24 being contiguous with the edge 19 of each drill flute Also, the effect of this rolling operation performed by the plain faces 28 of the co-operating dies is to roll the displaced metal so as to form the faces 15 into true portions of a cylindrical surface. This tends to improve the drilling action of the screw when it is used with a tool which applies simultaneous vibratory impacting and rotary torque to the screw to cause it to form its own pilot hole in a sheet metal workpiece.

We claim:

1. A self-tapping screw having a head at one end of a threaded shank and a point formation at the other end wherein the point formation comprises a number of planar piercing faces which are equi-angularly spaced apart about the axis of the screw and a corresponding number of drill flutes each disposed, and extending between, adjacent piercing faces, each piercing face extending from the extremity of the point formation in a direction radially outwardly and towards the head and each drill flute having a leading side wall in a radial plane, or parallel to a radial plane, in relation to the screw axis and a trailing side wall in a plane parallel to a radial plane, the outer edge of said leading side wall being contiguous with the edge of the immediately adjacent piercing face, whereby such outer edge constitutes a shearing and piercing edge when the screw is subject to impact in the direction of its axis and subject to rotary torque about its axis, and wherein each drill flute has a planar base extending between said side walls with each of said side walls being angularly related thereto and which base extends from the point extremity radially outwardly and in a direction towards the head of the screw.

2. A self-tapping screw according to claim 1 having two piercing faces and two drill flutes and wherein the thread on the shaank is a two-start thread.

3. A self-tapping screw according to claim 2 wherein the leading side walls of the two drill flutes lie in a common diametrical plane and the trailing side walls lie in spaced parallel planes which are equi-distantly spaced apart from the screw axis on opposite sides thereof so as to provide a relatively thick web across the central axis of the point between the two drill flutes.

4. A self-tapping screw according to claim 3 wherein the said piercing and shearing edge of each leading side wall of each drill flute has a first part which extends from the shank in the direction radially outwardly and towards the point extremity to an intermediate point and a second part which extends from said intermediate point radially inwardly and downwardly to the point extremity, said intermediate point being at a radial distance from the central axis of the screw which is greater than the radius of the core of the shank of the screw.

5. A self-tapping screw according to claim 4 wherein the angle subtended at the point extremity by the two planar bases of the drill flutes is approximately 40° and wherein the angle between the said two second parts of the piercing and shearing edges lies between 90° and 140°.

References Cited

UNITED STATES PATENTS

| | | | |
|---|---|---|---|
| 2,507,882 | 5/1950 | Berman | 85—47 |
| 3,125,923 | 3/1964 | Hanneman | 85—47 |
| 3,241,426 | 3/1966 | Gutshall | 85—47 |
| 3,318,182 | 5/1967 | Carlson | 85—41 |
| 3,395,603 | 8/1968 | Skierski | 85—47 |

RAMON S. BRITTS, Primary Examiner

U.S. Cl. X.R.

77—67